United States Patent
Bugnion (12) 
(10) Patent No.: US 6,704,925 B1
(45) Date of Patent: Mar. 9, 2004

(54) DYNAMIC BINARY TRANSLATOR WITH A SYSTEM AND METHOD FOR UPDATING AND MAINTAINING COHERENCY OF A TRANSLATION CACHE

(75) Inventor: Edouard Bugnion, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 09/203,825

(22) Filed: Dec. 1, 1998

Related U.S. Application Data (63) Continuation-in-part of application No. 09/179,137, filed on Oct. 26, 1998, now Pat. No. 6,397,242, and a continuation-in-part of application No. 09/151,175, filed on Sep. 10, 1998, now Pat. No. 6,496,847.

(51) Int. Cl.$^7$ .............................................. G06F 9/455
(52) U.S. Cl. .............................. 717/138; 709/1; 703/26
(58) Field of Search ............................. 703/23, 26, 27; 709/1; 717/127–130, 134–139, 148

(56) References Cited

U.S. PATENT DOCUMENTS

| | | | | |
|---|---|---|---|---|
| 5,167,023 | A | 11/1992 | de Nicolas et al. ........... | 703/27 |
| 5,307,504 | A | 4/1994 | Robinson et al. .............. | 712/41 |
| 5,619,665 | A | * 4/1997 | Emma ......................... | 712/208 |
| 5,832,205 | A | 11/1998 | Kelly et al. .................... | 714/53 |
| 6,631,514 | B1 | * 10/2003 | Le ............................... | 717/137 |

OTHER PUBLICATIONS

Site et al., "Binary Translation," Digital Technical Journal, vol. 4, No. 4, Special Issue 1992, pp. 1–16.
Witchel et al., "Embra: Fast and Flexible Machine Simulation," Sigmetrics '96, pp. 1–12.
Bugnion et al., "Disco: Running Commodity Operating Systems On Scalable Multiprocessors," ACM Trans. on Computer Systems, vol. 15, No. 4, Nov. 1997, pp. 412–447.
Cmelik et al., "Shade: A Fast Instruction–Set Simulator for Execution Profiling," ACM Sigmetrics, 1994.
Rosenblum et al., "Using the SimOS Machine Simulator to Study Complex Computer Systems," ACM Trans. on Modeling and Computer Simulation, vol. 7, No. 1, Jan. 1997, pp. 78–103.
Ebcioglu et al., "DAISY: Dynamic Compilation for 100% Architectural Compatibility," IBM Research Report RC 20538 Aug. 5, 1996, pp. 1–82.

* cited by examiner

*Primary Examiner*—St. John Courtenay, III
(74) *Attorney, Agent, or Firm*—Jeffrey Pearce

(57) ABSTRACT

A dynamic binary translator converts input instruction sequences into output instruction sequences that are stored in a translation cache. In order to maintain coherence of the translation cache with the run-time version of the input instructions, translated code is checked by either a conflict detection mechanism or a code-invariance mechanism. For conflict detection, the system preferably uses memory traces generated by the memory management unit of the underlying hardware processor. In order to check for code-invariance, preludes for comparing cached, output instruction sequences with their supposed run-time input instruction equivalents are appended to the cached instructions themselves. Changes in the input sequences then result only in retranslation of instruction sequences in which at least one instruction has changed; this avoids costly total flushes of the translation cache. An additional prelude is appended to any cached output sequences displaying characteristics of potentially self-constant-modifying code. If the input instructions have since translation changed with respect only to constants, then the constants are updated before execution; this completely eliminates the need for flushing the translation cache or retranslating the instruction if only constants have changed since the original translation. The invention is preferably incorporated in a virtual machine monitor, on which a virtual machine is running.

11 Claims, 3 Drawing Sheets

DYNAMIC BINARY TRANSLATOR WITH A SYSTEM AND METHOD FOR UPDATING AND MAINTAINING COHERENCY OF A TRANSLATION CACHE

CROSS-REFERENCE TO RELATED APPLICATIONS

This application is a continuation-in-part of both U.S. patent application Ser. No. 09/151,175 filed Sep. 10, 1998 now U.S. Pat. No. 6,496,847 and U.S. patent application Ser. No. 09/179,137 filed Oct. 26, 1998 now U.S. Pat. No. 6,397,242.

BACKGROUND OF THE INVENTION

1. Field of the Invention

This invention relates to a dynamic binary translator, which may be used in a virtual machine monitor to virtualize a computer system or an emulator that simulates a computer system.

2. Description of the Related Art

Binary translation is a technique that allows the execution of binary codes for a first architecture (the simulated architecture) on a second architecture (the host architecture). Binary translators between different architectures are known as cross-architectural. The two architectures may, however, be identical. In this latter case, the binary translation is often used to instrument an executable instruction so that the execution of the program provides additional information about its execution.

Binary translators provide a performance advantage over software interpreters. Software interpreters simulate in software the fetch-decode-execute cycle of the simulated architecture by reading each instruction one at a time and simulating its execution. Binary translators offer superior performance by taking groups of instructions (or even the entire program) and generating a corresponding sequence that executes directly on the host processor. Binary translators fall into two main categories—static and dynamic.

Static binary translators perform the translation of the original instruction sequence before the execution of the program. In their seminal paper "Binary translation" (Communication of the ACM Volume 36, 1993), Sites, et al., give a good introduction to the topic of static binary translators. Certain translators, known as closed translation systems, require that all of the instructions that the program eventually executes must be known at translation time; one example of such a translator is the binary editing ATOM system described by Alan Eustace and Amitabh Srivastava in "ATOM: A Flexible Interface for Building High Performance Program Analysis Tools," Digital WRL Technical Note 44.

Other binary translators, known as open translation systems, attempt to translate as much of the code as possible and revert to a slower software emulator for the portions that have not been translated. This is the case in the VAX-to-Alpha translator described by Sites, et al., and also in the FX!32 system from Compaq/DEC that translates x86 binaries to Alpha.

Dynamic binary translators perform the translation from an original instruction sequence to a host instruction sequence during the execution of the program. The translated code sequences are then stored in a buffer called the translation cache. The binary translation function is interleaved with the execution of the output of the binary translator. Dynamic binary translators have been used in architectural simulators such as Shade (See Cmelik and Keppel, "Shade: A Fast Instruction-Set Simulator for Execution Profiling," SIGMetrics '94) and machine simulators such as SimOS (see Witchel and Rosenblum, "Embra: Fast and Flexible Machine Simulation," ACM SIGMetrics '96). Dynamic binary translators have also been used to build virtual machine monitors (see Ebcioglu and Altman, "DAISY: Dynamic Compilation for 100% Architectural Compatibility," IBM Research Report #20538). Dynamic binary translators are also used to build fast Java Virtual Machines; in that context, they are sometimes referred to as "just-in-time compilers."

A dynamic binary translator is also used to provide cross-architectural compatibility as described in U.S. Pat. No. 5,832,205 ("Memory Controller for a Microprocessor for Detecting a Failure of Speculation on the Physical Nature of a Component Being Addressed," Kelly, et al.). In the discussion below, this system is referred to as the "Transmeta" system.

Binary translators share one common problem not found in simpler software interpreters: the execution of the translated code sequence can lead to a correct execution of the program only if the original sequence that it emulates has not been modified since its translation. Certain systems, including most static translators and some dynamic translators assume that such modifications don't occur; these systems ignore the problem rather than solve it. More recent dynamic binary translators such as SimOS, DAISY, and the Transmeta processor, however, guarantee the coherency of the translations that have been generated and are stored in the translation cache. In effect, they solve the translation cache coherency problem, but they do so using a technique referred to below as "conflict detection." This technique has the disadvantage that it leads to poor performance in a wide range of cases. The technique of conflict detection is discussed in greater detail below.

Rather than simulating CPUs by interpreting an instruction sequence one instruction at a time, dynamic binary translators thus translate blocks of instructions into code that, when executed, emulate the execution of the original block. The translated blocks are then stored into a memory buffer for further reuse. The use of binary translation eliminates most of the overheads of software interpretation.

Figure 1:
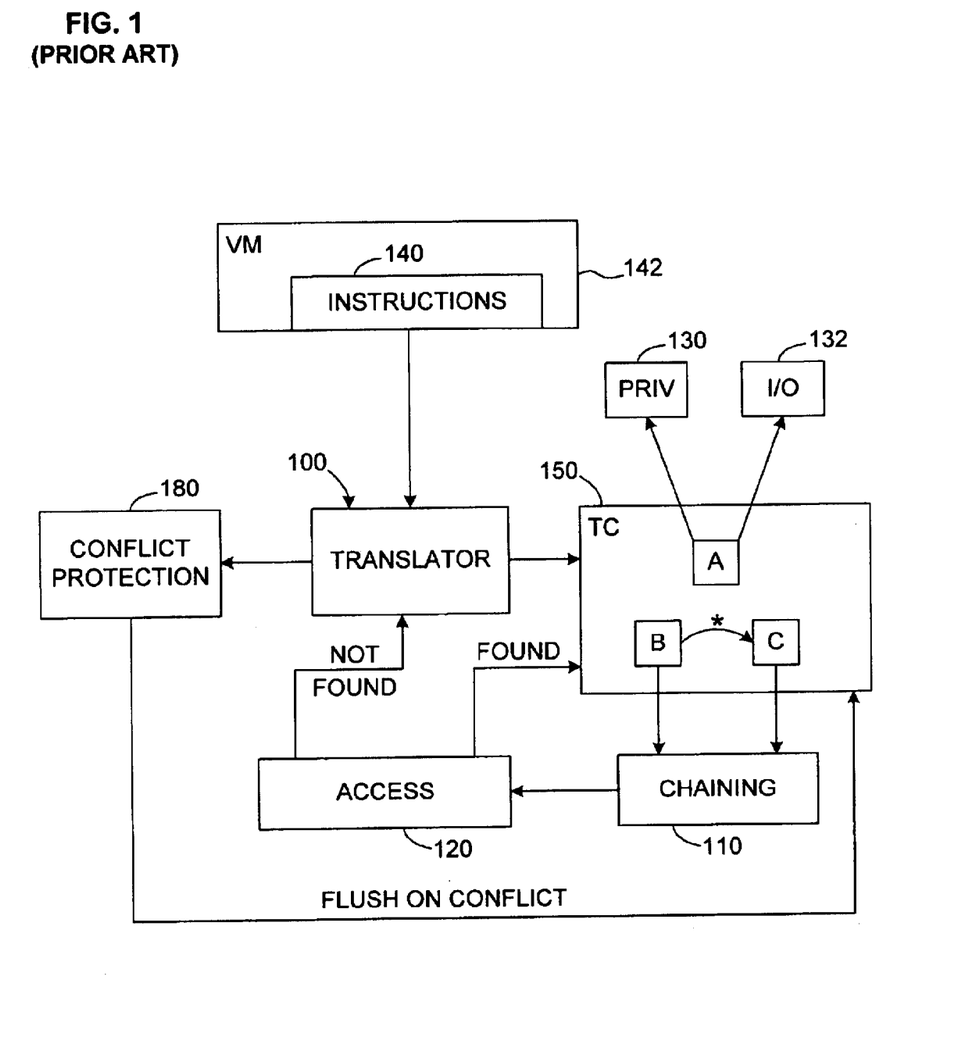
FIG. 1 illustrates the general structure and operation of a binary translation system according to the prior art.

A basic binary translation system according to the prior art is illustrated in FIG. 1. As FIG. 1 illustrates, a conventional binary translation system typically consists of a translator 100, a chaining subsystem 110, an access module 120, and various callout routines. By way of example, two callout routines—for privilege emulation 130 and I/O 132—are illustrated.

The translator converts blocks 140 of instructions received as input from a virtual machine (VM) 142 or other emulated system into a sequence of instructions that run on the host architecture. The generated code (or emitted code) is then stored into a memory buffer known as a translation cache (TC) 150. In FIG. 1, three translated and stored code sequences are illustrated as blocks labeled A, B and C.

Callout routines are functions of the simulation system or virtual machine monitor that can be called by the code emitted by the translator. The translator inserts direct or indirect calls to these functions into the emitted code. Callout routines are used, for example, to emulate certain instructions with complicated semantics. In FIG. 1, code block A is shown as having a callout to both routines 130 and 132.

The chaining subsystem is a mechanism that allows an emitted instruction sequence to directly branch to another emitted sequence, without relying on more than one callout (the callout to the chaining subsystem itself). In FIG. 1, the chaining module 110 is shown as having inserted a branch or "patch" (symbolized by an asterisk *) between code blocks B and C within the TC 150. This is an optimization over a naive implementation in which all emitted code blocks always end with a callout to a routine that looks up the translation of the next basic block.

The idea behind binary translation is the reuse of previously generated translations. The access module 120 determines the location in the TC 150, if one is to be found, of the translation that corresponds to the start of a given instruction sequence. If no translation is found, then the access module transfers control to the translator to generate a translation.

This basic design of a binary translation system relies on the invariance of the code, that is, the instruction sequences, that served as the input to the binary translator. If the content of the program stored in the memory of the simulated system or virtual machine changes during the execution, then the cached translations that emulate the behavior of the modified instructions are typically discarded, effectively forcing the translator to re-translate the instruction sequence a second time.

Early binary translators such as Shade effectively ignored the problem of possible code variance, since it did not occur in the cases for which Shade was designed. More recent systems such as SimOS and DAISY, however, address and solve the problem by detecting inconsistencies and taking appropriate actions in the case of a violation of translation cache coherency.

SimOS includes a MIPS binary translator called Embra. Embra is described in "Embra: Fast and Flexible Machine Simulation," by Witchel and Rosenblum, which is cited above. The Embra simulator needs to simulate in software the memory management unit (MMU) of the simulated system. This means that the simulator must translate each data reference from a virtual address issued by the simulated processor to a physical address. The simulated physical address is then used to index into the simulated memory. Both versions use a data structure called the "quick check" to allow the code emitted by the binary translator to easily and efficiently determine 1) the physical address of a given virtual address, that is, the relocation of virtual addresses; and 2) whether the access is legal. Those skilled in the art will recognize that the quick check may include only a subset of the mappings that are currently in the simulated MMU. If an entry is not in the quick check, then the emitted (dynamically generated) code will do a callout that simulates an exception if the mapping is not in the MMU, and possibly also insert a plurality of entries in the quick check.

The Embra simulator detects conflict violations as follows: Mappings that point to pages that contain at least one byte of input to the current set of cached translations are never inserted quick check. All accesses to these pages rely instead on the slower callout mechanism, which, as a side effect, ensures the coherency of the translation cache by discarding conflicting translations. In effect, the quick check data structure acts as a conflict detection module 180.

In contrast to the software-based SimOS solution, the DAISY system uses specific hardware support to mark portions of the physical memory of the virtual machine that contain input to translators so that the processor cannot access them. Although it is unclear from the technical report referenced above, it seems that the proprietary hardware has a notion of memory "unit" and associates one bit for each unit of physical memory. Moreover, the size of the unit seems to be settable, for example to match a PowerPC page size (4 KB), but also smaller granularities down to 1 byte.

The Transmeta chip uses a technique similar to that found in DAISY, namely, the "T" bit of the "translation-lookaside buffer" TLB. This is described in U.S. Pat. No. 5,832,205.

As will become clearer from the discussion below, the present invention also incorporates a conflict-detection mechanism. In particular, the preferred embodiment of the invention uses the hardware MMU to detect conflicts. Unlike these systems, however, it does so on conventional hardware in the context of a virtual machine monitor.

What is needed is therefore a binary translation system that more efficiently handles not only the problem of maintaining translation cache coherency, but that also more efficiently addresses and solves the problems that arise due to self-modifying code. This invention provides such an improvement.

SUMMARY OF THE INVENTION

The invention provides a system and a method for virtualizing a computer using binary translation. According to the invention, input instruction sequences are converted by binary translation into output instruction sequences that emulate the corresponding input instruction sequences. The input instruction sequences being stored in predetermined pages of a system memory. The output instruction sequences are stored in a translation cache.

The invention maintains coherency of the output instruction sequence with the input instruction sequence by selectively executing either of the following sub-steps: 1) it detects conflicts in the memory pages in which a first set of the input instruction sequences is stored and executing the corresponding output instruction sequences only in the absence of detected conflicts; or 2) it explicitly checks for code-invariance by checking for post-translation changes in a second set of input instruction sequences by comparing the copied input instruction sequences with a current version of the corresponding input instruction sequence, before executing the corresponding output instruction sequence.

In the preferred embodiment, the binary translation system according to the invention sets the hardware memory management unit (MMU) of the computer itself to detect memory traces on the memory pages in which the first set of the input instruction sequences is stored.

The step of checking for post-translation changes includes the following sub-steps: a translation-time copy of each input instruction sequence is stored in the second set of instruction sequences; an instruction invariance prelude is appended to a translation-time copy of each output instruction sequence for which there and storing the instruction invariance prelude in the translation cache along with the corresponding output instruction sequence; for each output instruction sequence for which there is an instruction invariance prelude, the instruction invariance prelude is executed before executing the corresponding output instruction sequence. In the preferred embodiment of the invention, the sub-step of executing the instruction invariance prelude preferably comprises the further sub-steps of comparing the corresponding translation-time copy of the input instruction sequence with a corresponding current state of the input sequence with a current; and executing the output instruction sequence only when the current state is the same as the translation-time copy.

In the preferred embodiment of the invention, storing of the translation-time copy of each input instruction sequence is done by encoding the translation-time copy as an immediate operand of compare instructions in corresponding ones of the instruction invariance preludes. Preferably, only the input instruction sequence for which the current state is different from the translation-time copy is reconverted by binary translation.

The invention provides a unique method for efficiently processing code that is self-constant-modifying. For each output instruction in an output instruction sequence for which the current state is different from the translation-time copy, the system therefore is also provided to detect whether the output instruction sequence is self-constant-modifying. Thereafter, only the input instruction sequence for which the current state of operation portions of each instruction included in the sequence is different from a corresponding portion in the translation-time copy is preferably reconverted by binary translation.

In the preferred embodiment of the invention, the system preferably checks for run-time invariance of the operational instruction portion by executing a code-invariance prelude that is appended to the output instruction as stored in the translation cache. For each input instruction sequence for which the current state of the operational portions is the same as corresponding portions in the translation-time copy, the system then executes a constant-updating prelude that is appended to the output instruction and thereby updates the modifiable constant portion of the output instruction by replacing it with a corresponding run-time constant portion of the input instruction in the current state. Furthermore, the system then executes the output instruction using the updated modifiable constant portion.

The binary translator according to the invention preferably switches between conflict detection and code-invariance checking of the input instruction sequences according to a predetermined memory page cost optimization function, which is evaluated for each memory page that contains input instructions.

BRIEF DESCRIPTION OF THE DRAWINGS

FIG. 3 illustrates how the invention includes a code invariance checking procedure alongside a conflict detection procedure in order to ensure translation cache coherency.

DETAILED DESCRIPTION

This invention provides a novel mechanism in a binary translator that ensures translation cache coherency. The invention uses a combination of two mechanisms, one that is substantially known (page-based coherency), and one that is completely novel (code-invariance checking) to ensure translation-cache coherency. The invention also includes a novel approach that efficiently allows the emulation of self-modifying code-segments by extending the binary translator in order to generate self-updating translations.

The binary translation system (or, equivalently, the "binary translator") according to the invention is preferably used within a virtual machine monitor such as that described in the co-pending application U.S. patent application Ser. No. 09/179,137, which in turn may be used to advantage in a system where the virtual machine monitor is co-resident at system level with a host operating system, as is described in co-pending U.S. patent application Ser. No. 09/151,175. Both of these applications are incorporated by reference here. Nonetheless, the binary translation system according to this invention may also be used in other systems, for example in systems that include a different virtual machine monitor, or in an emulator, or in any other virtualization system that implements binary translation.

In the most common application of this invention, the binary translation subsystem described below is included in a virtual machine monitor, on which a virtual machine is running. The virtual machine monitor acts as a kind of "intermediary" between the virtual machine and the actual, physical system hardware, in particular, the hardware processor(s). The virtual machine includes a virtual operating system, on which one or more application programs are effectively running. The virtual operating system in turn "believes," that is, performs as if it were running on real processor when it is in fact running only a virtual processor in the virtual machine. Instructions issued within the virtual machine are taken from the instruction set and in the syntax of the virtual processor, which need not be of the same type or architecture as the actual, physical hardware processor(s).

In fact, however, instructions issued by the virtual machine (more precisely, its virtual operating system) are received by the virtual machine monitor and it is the job of the binary translation subsystem, when binary translation is called for, to convert or "translate" instructions or instruction sequences into code suitable for running on the hardware processor. (See co-pending U.S. patent application Ser. No. 09/179,137 for a detailed discussion of a case where a binary translator is implemented along with a direct execution engine in the virtual machine monitor.)

The concepts and structure of a virtual machine, a virtual operating system, a virtual processor, and a virtual machine monitor—indeed, in general, even of a binary translation sub-system—are known in the art. The arrangement of a virtual machine running on a virtual machine monitor is assumed below because it is the most likely configuration where the invention will come to use. The novel binary translation subsystem and methods described below may, however, be used to advantage in any system where binary translation is implemented. For example, the invention can also be incorporated advantageously into emulators and simulators that rely on binary translation.

In order to fully appreciate the advantages of the invention, it is helpful to recall some of the concepts that define not only the problems to be solved but also the solutions the invention provides. These concepts include translation cache coherency and self-modifying code.

Translation Cache Coherency Violations

Translation cache coherency violations occur in practice in several situations, some of which are described below. First, a computer system has a finite amount of memory, which forces the operating system to reuse the same portions of the memory to store different programs at different times. Failing to correctly handle the translation cache coherency problem would result in executing the previously stored program fragment, even though the operating system expects the execution of the newly stored program. This clearly leads to an incorrect behavior.

Second, certain systems use a technique known as code patching to efficiently resolve external symbol conflicts between modules that are compiled separately. This technique is used, for example, in Windows 95, in modules referred to as "VxD's." At compilation time, a first module may, for example, not know the address of a function F that is stored in a second module. The address of the function F will, however, be known at run-time by the operating system. Since the address of F is not known, the original version of the code of the first module contains a call to a patching routine in all locations where a call to F is expected. The patching routine, which executes at run-time and knows the address of F, replaces its own call site with a call to F. Subsequent calls will then go directly to F. Systems can alternatively substitute the original call to the patching routine with an interrupt or an illegal instruction. In that case, the interrupt handler or illegal instruction exception handler performs the patch. The use of code patching leads to a high number of violations of the coherency of the translation cache, since the instruction sequence that has just previously executed is changed by the patching routine.

Code patching is also routinely used as an optimization. For example, certain operating systems can execute on multiprocessors, but such execution requires a proper synchronization between the different processors (such synchronization is not required when the computer system consists of only one processor). The synchronization routines can then be replaced with routines that patch the call site with a more efficient instruction sequence.

Third, some systems employ a programming technique known as self-modifying code, which is an instruction sequence that repeatedly modifies itself during its own execution. This technique was in vogue in earlier generations of computer systems where memory was scarce, but lead to software engineering problems. Self-modifying code is much harder to debug than "regular" programs, and typically requires that the algorithms that use it be implemented in assembly language, which leads to further problems of maintainability and portability. Nevertheless, self-modifying codes are still used in areas where performance is critical, for example, in the innermost loops of graphics drivers. Consider the following algorithm:

For all columns in 0 . . . N DO
        For all lines in 0 . . . M DO
            F(column,line)
        END
    END where F is a function that requires the two arguments "column" and "row." In this case, every time F is computed, it must separately cause a fetch from memory of both row and column, even though the column does not change during the computation of F for M lines in a row. The system must therefore perform 2×M×N for such a computation.

A much faster way to perform this operation is instead to compute a function F', where "column" is a known constant rather than an unknown variable. A faster, self-modifying algorithm would then be:

FOR all columns in 0 . . . N DO
        Set known constant in F' to be "column"
        FOR all lines in 0 . . . M DO
            F'(line)
        END
    END In this case, the "column" parameter needs to be accessed and set only N times. Since it is "pre-set" in F' before line calculations, F' does not need to fetch it. Only N×M+N fetches are required in this computation, which is a substantial improvement over the 2×M×N fetches required when using the first algorithm.

Note that other techniques and compiler optimizations could lead to the same improvement, especially on a machine with a large register file. This example of self-modifying code is applicable, however, even to processor architectures such as the Intel x86 that have a small number of registers. Again, this example is presented merely for tutorial purposes. As is explained below, one aspect of the invention applies to a broad class of self-modifying code patterns that are referred to here as "self-constant-modifying" code.

Self-modifying code leads to potentially big performance problems for binary-translators, since the translations must be constantly updated as the contents of the memory change. In the above example, the translator would need to be invoked at least N times, each time to reflect the new contents of F'.

A fourth common occurrence of translation cache violations occurs when the simulated software itself generates code dynamically, for example when the simulated software is itself a binary translator.

This invention uses a combination of two mechanisms to ensure the coherency of the translation cache. These two mechanisms are described separately below. Then, the way in which the system according to the invention combines the two is described.

Conflict Detection

In order to ensure translation cache coherency, it is necessary to detect that a conflict has even arisen. Like other prior systems such as SimOS, DAISY and Transmeta, the system according to the invention preferably includes a conflict-detection approach (with certain novel features described below) to translation cache coherency. The system thus maintains the set of memory locations used as an input to the translations currently stored in the translation cache. At translation time, this set is extended to include the new translation. When the translation cache is cleared, the set is also cleared.

The set of input locations can be used to derive the set of memory pages that include at least one input memory location. Memory traces are set on all of these pages by the emulator or virtual machine monitor in which the binary translation system according to the invention is included. These traces guarantee the notification to the translator of all write accesses made by the processor to any of the pages that include such a trace. The implementation of the preferred memory tracing mechanism is described below.

Upon notification of a traced access, the conflict-detection sub-system of the invention compares the exact access address with the set of input memory locations. If the access spans more than one memory location, then all memory locations are checked. If an overlap is detected, then the system must guarantee that the offending translations (the ones whose input overlaps with the accessed memory locations) are never executed in the future. In the preferred embodiment of the invention, the translation cache is totally cleared, thereby trivially guaranteeing this property. This reduces the amount of information the system needs to maintain while still guaranteeing this property. The translation cache need not be totally cleared, however, if the invention is modified to maintain enough information to selectively discard a smaller subset of the translation; those skilled in the art will be able to properly modify the invention based on their own decision concerning whether it is more efficient in any given implementation to totally clear the translation cache or to track and maintain more information about it.

Note that the conflict detection method according to the invention does not need to maintain the exact set of locations that were used as input to the binary translator. For example, maintaining a superset of these memory locations will also lead to the correct detection of conflict violations. A disadvantage of such an approach is that it also leads to additional supposed conflicts, when the write access overlaps with the superset, but not with the exact set. On the other hand, maintaining a superset is advantageous as it can lead to a reduction of the space required to keep track of the set of memory locations. For example, depending on the implementation method used, maintaining the exact set of locations can require a memory overhead comparable to the size of the memory of the simulated system (the virtual machine). However, a superset information that records only the pages that contain instructions rather than the individual locations can be computed with a memory overhead comparable with the number of pages of the simulated system.

In other words, there is a trade-off between the "exactness" or "granularity" of the memory traces and the memory overhead required. In any given implementation of the invention, the granularity may be chosen using conventional design methods to optimize the trade-off. This invention is not dependent on any particular memory trace granularity.

In the preferred embodiment of this invention, the superset information is computed using a hybrid that combines a superset maintained at the page granularity with an exact location information for a small set of pages. The memory overhead for the superset consists of one bit per page of the physical memory of the simulated system or virtual machine. The system maintains the exact location information only for a fixed number of pages, namely, those that previously recorded conflicts or assumed conflicts that violate the translation cache coherency. This hybrid method has been shown to lead to good results, that is, to only a small number of assumed violations that were not true translation cache coherency violations, and to be able to do so with a reasonable memory overhead.

Memory Tracing

As mentioned above, the conflict detection method according to the invention relies on a more general mechanism called "memory tracing". This mechanism or subsystem allows for the system to dynamically set traces on portions of the memory, so that all subsequent accesses or modifications of these portions lead to an immediate notification to the subsystem that requests the trace.

In the preferred embodiment of this invention, in which the binary translation system is a sub-system included in a virtual machine monitor (VMM), memory tracing allows the VMM to set memory traces on physical pages of the virtual machine. In this embodiment, the memory tracing subsystem requests that the set of locations to be traced be specified with a given granularity, for example, one that would match the page size.

For example, the subsystem for detecting conflicts in translation cache coherency would install a memory trace on all pages that were used as input to at least one currently cached translation. The subsystem would install a write-only trace, since read accesses don't violate the coherency. When the trace is generated, the translation coherency subsystem may use some additional information to determine if the location being modified actually leads to a conflict. For example, a write to a portion of the page that does not contain inputs to translated code causes no conflicts, so that the binary translator can resume without having to change the state of the translation cache.

In the preferred embodiment of this invention, the memory tracing mechanism is implemented by using the memory management unit (MMU) of the system processor and the ability, through hardware or software, to execute a single instruction, that is, the ability to "single-step" the virtual machine running on the virtual machine monitor. The MMU is used to "downgrade" the access permissions on the traced pages. Specifically, pages with a write-only trace never have the "write-access" permission enabled, and read-only and read/write traces never have the "access" permission enabled. The use of the MMU leads to the highest performance since all checks are done in hardware, with no overhead for accesses on pages without traces.

Depending on the system architecture, the use of the MMU has two principal consequences. In the most common case where the system architecture is the Intel x86 architecture, the granularity is fixed to match the page size. In other words, the sub-system can request only that particular pages in memory be traced. Second, since the MMU manages virtual-to-physical mappings and the traces are set on physical pages, the system needs to be able to manage mappings in the "reverse" direction, that is, physical-to-virtual mappings, through so-called "backmaps."

The use of a conventional processor architecture such as the Intel x86 leads to two complications not found in systems such as DAISY and Transmeta. First, the page size is determined by the hardware. In the case on the Intel x86, this page size is either 4 kB or 4 MB. In contrast, available descriptions of DAISY briefly discuss using a smaller page size in order to limit the number of false conflicts.

Second, the hardware inserts entries into the MMU according to a format that is defined by the processor architecture. Indeed, the Intel x86 has what is known as a "hardware reloaded TLB." This format does not provide an automatic, hardware-based mechanism for downgrading the permissions on a given virtual page according to the state of the physical page. This ability is, however, present in DAISY and possibly in the Transmeta chip as well. In order to overcome this second limitation, the binary translator according to the invention, or, more generally, the virtual machine monitor used in the preferred embodiment of the invention, must maintain mappings in the reverse direction.

The backmap information is used to efficiently compute the inverse-mmu( ) function, that is, the set of virtual pages that currently map a specific physical page in the real (VMM) page tables. For example, in the preferred embodiment of the invention, the backmap information consists, for each virtual page, of two virtual page numbers. The inverse-mmu( ) function can therefore return zero, one, or two virtual pages that map any given physical page. Note that this backmap information is correct only when a given physical page is never mapped by more than two virtual pages. The VMM ensures that this condition never occurs. When a third page is inserted by the VMM into the page tables, the VMM chooses one of the two existing pages (according to any predefined selection scheme or even simply at random) and evicts it to make room for the incoming page.

To accomplish this memory mapping, the invention preferably implements a method with the following main steps:

1) If a trace is installed on a given page, then all entries returned by the inverse-MMU function, that is, virtual page mappings, have their permissions downgraded. A permission downgrade involves setting pages with a read-write trace to be inaccessible so that both read and write accesses lead to exceptions that are interpreted as traces.

The permission downgrade sets pages with a write-only trace to be read-only, so that only writes to the page lead to faults.

2) When an entry is inserted in the MMU, that is, a virtual-to-physical mapping is inserted, the permissions are downgraded according to traces on the physical page.

3) When a page fault occurs as a result of downgraded permissions on a page with a trace, the permission downgrade is temporarily removed and the virtual machine is allowed to complete the instruction that caused the fault.

4) Once the instruction that caused the fault completes, that is, the single-stepping of that instruction is successful, the MMU entry is restored to its original state with permissions downgraded. The subsystems that requested the trace are then notified of the access. Note that a single instruction can access multiple locations in memory, each with a potential trace. In that case, more than one entry is restored and subsystems are notified of the accesses.

5) If the execution of the instruction leads to an exception of the virtual machine, then the MMU entries are restored to their default state. The subsystems are not notified, since the instruction never completed.

Some form of memory tracing mechanism is required to efficiently support translation cache coherency and to virtualize segmented architectures. The method outlined above is preferred because it has proven to be efficient, but other methods are also possible. For example, in the absence of specific hardware support, the main room for alternative solutions is in the implementation of the backmap information. In the preferred embodiment of the invention, two backmaps are implemented; it would be an obvious adaptation, however, to maintain more than two backmaps.

It would also be an obvious adaptation to handle differently the overflow of the number of backmaps, for example by maintaining an additional flag that is set only when more than the maximum number of backmaps is present in the page table. The inverse-mmu( ) function called on such a page with the flag set would have the side-effect of flushing the entire page tables before returning the empty set, since it cannot efficiently determine the backmap.

Note that the single-stepping of a virtual machine instruction can be implemented either with hardware support (see, for example, the Intel reference manual and its discussion of the TF bit), or by emitting customized translations using known techniques (see the Embra paper for a discussion of customized translations).

Code-Invariance Checking

Unique to this invention is that, in addition to its improved conflict detection sub-system, it also includes an alternative mechanism or sub-system to ensure the coherency of the translation cache. The need for this dual-detection arrangement, that is, for the alternative sub-system or routine, is due in part to the following observation: Assume a page in memory that contains both instructions and data, such that the instructions are never modified, but the data is updated very frequently. The conflict detection method would use the MMU-based memory tracing, which would lead to a high number of page faults, single steps, and notifications to the conflict violation subsystem. In this example, the conflict violation would consistently realize that the write access does not overlap with the instructions used by the binary translator and that no actions need to be taken. This approach would lead to a correct result, but could suffer from a high overhead. Indeed, even when using this invention with a virtual machine monitor that directly accesses the MMU, the cost of a memory trace corresponds to the execution of thousands of instructions.

This invention avoids this overhead by implementing a unique method referred to below as "code invariance checking." Code invariance checking is based on the following idea: Rather than tracking down all writes that would violate the coherency of the translation cache, the system may simply double-check that the input instruction sequence used by the translator still corresponds to the current values found at the location of this input instruction sequence. If the check succeeds just before a translation is to be executed, then the coherency of that translation is guaranteed. If the check fails, then that translation cannot be executed, since it has become stale and a new translation must be generated. In short, if the translation is still valid, then there is no need to re-translate it.

This check can be performed efficiently within the translation cache without having to rely on callouts. Consequently, the binary translator according to the invention is extended to generate a "block prelude" before generating the instruction block that emulates the original instruction sequence. The prelude, which is a sequence of instructions inserted before those of the actual translation, consists of a sequence of comparisons, each comparing a memory location in the simulated system or virtual machine with an expected value. If any of these comparisons fails, then the prelude calls a "code-invariance failure" callout. This callout in turns calls the binary translator to generate an up-to-date translation. If all comparisons succeed, then the prelude ends without any side effects to the simulated system, and the execution portion of the emitted block follows immediately.

Overheads of Conflict Detection and Code-invariance Checking

In the discussion above, two different approaches are presented that solve substantially the same problem. This section first discusses the relative performance overheads of the methods by comparing their relative cost in the absence of any coherency violations. Thereafter, their relative impact, in terms of number of translations flushed, in the presence of coherency violations, is discussed.

Conflict detection is a hardware-based method. The memory tracing mechanism uses the MMU to protect the pages that contain code currently translated in the translation cache. This method has practically no overhead for pages that exclusively contain code or data that is never modified. Indeed, using the MMU by downgrading the privileges of certain pages does not impact the performance of non-trapping memory accesses at all, and pages that are never written don't generate traces.

On the other hand, the performance of the conflict detection method degrades with the increasing frequency of traces on a given page. Again, for the purposes of this immediate discussion, it is assumed that these traces don't lead to any violation, that is, the traced page contains a read-only portion that was used as input to the translator and a data portion that is accessed by the virtual machine.

In contract, code-invariance checking is a software-based solution to the same problem. Its overheads are significant but predictable, since each instruction block contains a prelude whose execution time is a direct function of the number of bytes involved in the comparison. Indeed, whenever code-invariance checking is used, one can expect to spend more time verifying that instructions have not changed than emulating them. Additionally, code invariance checking leads to a substantial increase in the size of the emitted sequence, which in turn leads to additional performance problems such as additional pressure on the hardware instruction cache, and overflows of the translation cache itself.

Consequently, code-invariance checking should preferably be used only as an alternative to conflict violation detection, rather than for all translations. Fortunately, the decision can be done at translation time independently for each page. The following optimization rules are therefore implemented in this invention:

1) a high trace frequency makes the code-invariance checking method more attractive; and 2) a high execution frequency for the blocks on the page makes the conflict detection approach more attractive.

Unfortunately, the decision must be made at translation time, when the future frequencies of each case are unknown. Moreover, this decision must be made for each memory page, on the first translation that uses that page as input. Because of this, the decision to use conflict detection or code invariance checking must be based on a heuristic.

A final complication is that different actions are required in the presence of actual violations of the coherency of translation cache, as is discussed below. In short, the cost of an actual violation, which is primarily a function of the number of translations that must be discarded, is a function of the coherency method used.

The system can decide whether to use conflict detection or code-invariance checking independently for each page of the virtual machine. The decision is made when the first translation of a given page is inserted in the current translation cache, that is, if no valid translation for that page is currently present in the cache.

At this point, there are no longer any memory traces on the page, and thus no corresponding overheads. Clearly, the heuristic in this embodiment of the invention requires an additional rule to permit a transition of a page from the code invariance checking state back to the conflict detection state; otherwise, the system would have a monotonically increasing number of pages using the code invariance checking method. In the absence of statistics, the system may simply reset the state of the page back to the conflict detection after a certain predetermined time or equivalent measure (another heuristic parameter). This predetermined time may be measured, for example, as actual clock time, number of translations, or number of flushes of the translation cache.

Note that the heuristic parameters are preferably chosen to match the requirements of the particular workload. However, in one prototype of the invention, the simple heuristic rules described above have led to good performance results for a large class of workloads. Indeed, although only a small number of pages benefit from using the code invariance checking method, this alternative method has been shown to provide a substantial performance improvement over using the conventional conflict detection approach alone.

Total Flushes vs. Selective Replacement of Translations

The performance advantage of the code-invariance approach in certain circumstances is discussed above. A second advantage of preludes for code-invariance checking is that they allow for a selective replacement of translations in the case of conflicts: If a comparison fails, a new translation (with a new prelude) is generated to replace the stale translation. However, the translation cache need not be flushed, as it suffices to patch the stale translation with a jump to the new translation, thereby guaranteeing that the stale translation would never be again executed. This optimization is possible even with systems that also include a chaining mechanism.

In comparison, conflicts detected by the memory tracing mechanisms cannot be handled as easily. Where memory tracing is used, selective cache flushing would require the exact detection of all useable translations that overlap with the conflict area. In many systems such as Embra, and also in the preferred embodiment of this invention, this detection cannot be determined without adding specific data structures. Indeed, these systems locate translations through some closed hashing mechanism, which means that a translation entry point may be dropped from the cache. The translation may, however, still be reachable if the system includes some chaining optimization. As a result, the entire translation cache needs to be flushed if a conflict is detected by the memory tracing mechanism.

Translations of code sequences that are likely to result in a subsequent coherency violation are therefore preferably checked with code invariance checking rather than through the conflict detection mechanism. According to the invention, heuristics (selected through conventional experimentation and analysis) can be used to isolate such translations. For example, translations that have recently generated conflicts are likely to generate them in the future, as is, for example, the case with self-modifying code.

Code patching techniques, such as the ones used for relocation, and the ones used to patch synchronization routine calls, are also easily detected with some limited knowledge of the simulated system. For example, certain operating systems such as Windows 95 use a single predefined instruction—the interrupt 20H—for code patching (see Adrian King, "Inside Windows 95," Microsoft Press, 1994). Since this interrupt is not used for any other purpose in that system, the system according to the invention may assume that a conflict will happen whenever it detects this instruction, and forces a "preemptive" transition to the code invariance checking method. As a result, only that particular instruction block will need to be retranslated. Those skilled in the art will recognize that the double translation of patchable blocks that is achieved using this preemptive decision is an optimal solution in terms of the number of translations, since the block will have two distinct forms.

In one embodiment of this invention, a simple heuristic was used: the execution frequency for each page was not quantified; indeed, it was not even approximated. Rather, the number of occurrences of memory traces for the various pages of the system was counted. Once a page reached a certain predetermined threshold in a given interval, it was marked to use the code invariance checking method as soon as the trace could be removed. In the preferred embodiment of the invention, the system does not maintain sufficient information to determine which translations in the translation cache use particular pages of memory as input. As a result, the switch from the conflict detection method to the code-invariance method can occur safely only when the translation cache is empty (has been flushed).

By default, the system according to the invention therefore preferably uses the conflict detection method, but it starts using the code invariance method once the threshold of memory traces is reached (at the next flush of the translation cache). The threshold may be determined for any given application using conventional experimentation and analysis of the particular, given environment in which the invention is included.

To summarize, the invention includes two distinct mechanisms that solve the same problem. The system (that is, the module, such as a virtual machine monitor in which the binary translator is incorporated) according to the invention decides which mechanism to use while the first translation from a given memory page is inserted in the current set of cached instructions.

The relative advantages of the two mechanisms included in the invention are discussed above. Pages with a high number of "false conflicts," that is, writes to a portion of a page that does not contain code, are preferably handled using the code-invariance checking method, since it eliminates the overhead of page faults. Of course, the system preferably should not switch to using code invariance if the code, despite the high number of false conflicts, still runs so efficiently that conflict detection outperforms code-invariance. Pages with actual conflicts are preferably handled with the code-invariance checking method, especially in the preferred embodiment where the translation cache is completely flushed on conflicts.

Formally, the system according to the invention solves the following global optimization function, where "cost" is measured in predetermined units of time:

$$PAGE\_COST = C1 + C2 + C3 + C4; \text{ where}$$

PAGE_COST is a cost value for a given page;
- C1=number of memory traces multiplied by the average cost of a memory trace;
- C2=number of executed blocks with code-invariance checking multiplied by the average cost of a prelude;
- C3=number of conflicts detected through memory traces multiplied by the cost of flushing the entire translation cache; and
- C4=number of code-invariance checks that fail multiplied by the cost of translating a single block.

The global optimization function can then be approximated as the minimum of the sum of all the values PAGE_COST for all the pages in the system.

Note that this is merely an approximation, since one component of this cost function (flushing the entire cache) is itself a function of the frequency and distribution of the global flushes. Other global optimization functions may also be used, and those skilled in the art will recognize equally usable alternatives. Since the number of memory traces on any given page cannot be predicted beforehand, any chosen optimization function that relies, as it should for maximum performance, on a memory trace count will necessarily be a heuristic that can be determined by experimentation.

Self-Updating Translations

Previous techniques known in the art have focused on maintaining the coherency of the translation cache under the optimistic approach that violations involving updates of the code remain unlikely. In the case of code patching techniques, even though the case of a one-time violation is very likely, the odds of any subsequent violations are small. Furthermore, patches occur only once per location in the system, effectively making them a merely transient problem.

The two mechanisms presented above—conflict violation and code invariance checking—make the same optimistic assumption. Unfortunately, neither mechanism, or combination of the two, leads to acceptable performance where self-modifying code occurs. The conflict violation method would lead to flushes of the entire translation cache on every update of the self-modifying code sequence. The code invariance checking method would perform better in that only the offending translation sequence would need to be re-generated after each update of the original sequence; however, steady-state execution of an instruction sequence would consist of the repeated re-translation of the same sequences. This leads to sub-optimal performance, as the binary translator would need to be invoked over and over again.

One can observe, however, that self-modifying code sequences often have a particular, well-defined structure. In such instruction sequences—referred to here as "self-constant-modifying code"—the instruction sequences (the opcodes and addressing mode of operands) remain identical across updates, and only certain constants used either as immediate operands or as displacement constants are updated by the code itself. For example, in the Intel x86 instruction set, the instruction:

ADD 0x1291(%eax), 0x1776 adds an immediate constant (1776H) to an address specified at [%eax+1291H], where "%eax" is a register and "0x" is a prefix indicating an immediate constant in hexadecimal format. This instruction is encoded as follows:

byte:   1    2    3    4    5    6    7    8    9    10
offset: 0x81 0x80 0x91 0x12 0x0  0x0  0x76 0x17 0x0  0x0
             |-------displacement------| |--------immediate--------|

In this example, bytes (1) and (2) encode the instruction opcode and addressing mode. Bytes (3)–(6) encode the displacement 0x1291, and bytes (7)–(10) encode the immediate constant. Note that the encoding of the constants is "reversed," that is, that the least significant bytes precede the more significant bytes. This encoding, known as "little endian," is used by many computer architectures, including the Intel x86 used in this example.

In this example, the instruction would be self-constant modifying if it were part of an instruction sequence that would repeatedly modify the immediate and/or displacement bytes, that is, bytes (3)–(10), without modifying bytes (1) or (2). Note that such modifications would not change the size in bytes of either the input instruction or its binary translation. Binary translators known in the art, or using the conflict detection or code invariance checking method described above, would detect a conflict at each iteration, thereby forcing the re-translation of the block that contains the instruction.

According to the binary translation system and method of this invention, an updating module or routine generates code that automatically adapts to self-constant-modifying code sequences without having to rely on the translator (more specifically, on re-translation), or any static code accessed through callouts to perform the update. This is a non-trivial extension of the (also novel) code-invariant checking prelude, and requires the presence of the code-invariant checking mechanisms. The self-constant-updating mechanism, that is, the updating module, is applied selectively for translations that have failed the code-invariant check more than a predetermined number of times. This threshold may be determined by a heuristic, which may be determined through conventional experimentation for any given implementation of the invention. By way of example, the preferred embodiment of the invention sets this threshold at 2. For example, if the instruction that is self-constant-modified is modified and executed 1,000 times, the method would require 2 translations of the block with the code-invariant prelude, but only a single translation of the block with the extended self-updating prelude. (Note that many conventional systems that attempt to ensure translation cache coherency might require 1,000 translations.)

According to the invention, the main steps in the procedure for handling self-constant-modifying code are therefore the following: Rather than having the prelude check for the invariance of the code, the binary translation subsystem, upon translation of such an instruction sequence, separates the input instruction stream into two categories—(1) the instructions and opcodes that need to be checked for code invariance; and (2) the immediate and displacement constants, which are updated by reading the current values from the virtual machine and written into all the locations that use them subsequently in that same emitted sequence.

The self-constant-updating binary translation method according to the invention comprises the following steps. The description assumes, merely for the sake of simplicity, and without loss of generality, that constants are byte aligned. See FIG. 2.

Figure 2:
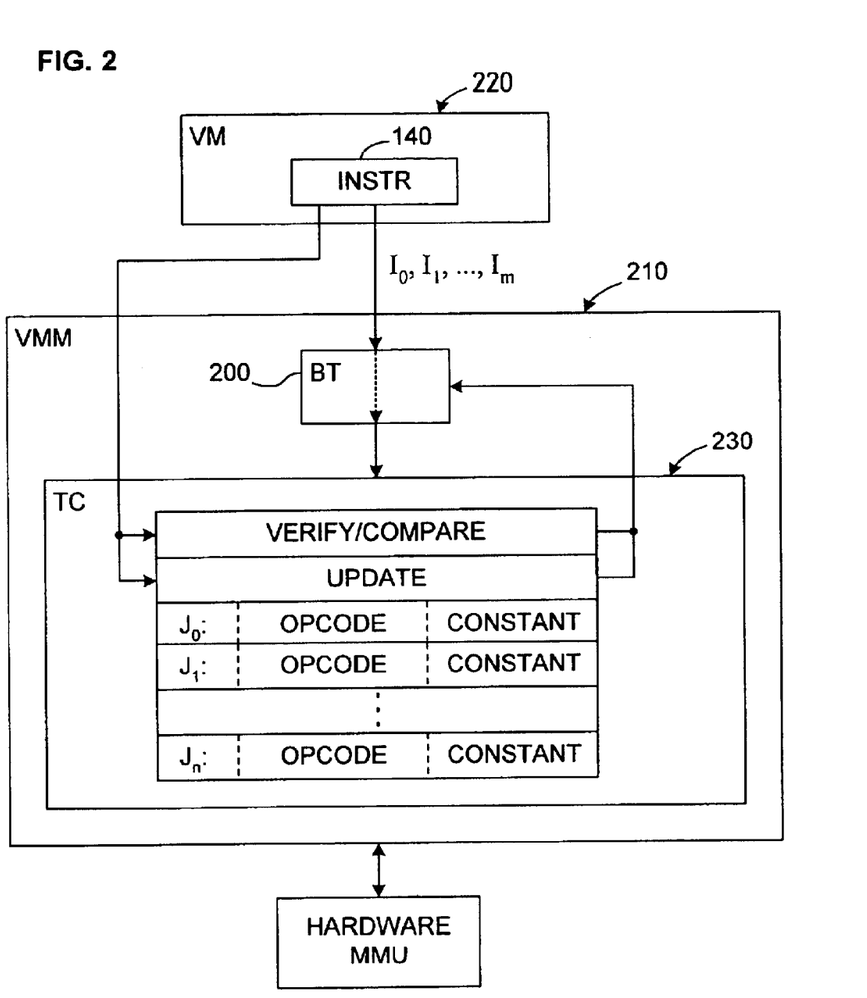
FIG. 2 shows the main aspects of a novel binary translation subsystem and various translation cache-based modules according to this invention, and their interaction with a virtual machine that is running on a virtual machine monitor.

1) The binary translation subsystem 200, which is included in a virtual machine monitor 210, translates each input instruction sequence $I_0, I_1, \ldots I_m$ which is received from the virtual machine 220, into a corresponding instruction sequence $J_0, J_1, \ldots J_n$. Notice that the number of emitted instructions does not have to be (and, in fact rarely will be) the same as the number of input instructions. Moreover, an instruction "sequence" will typically include all instructions in a given block (for example, page) of VM instructions, but it may also consist of more or fewer instructions (even a single one), depending on how many are chosen for input to the binary translator at a time.

The binary translator 200 classifies each input instruction $I_k$, $k\epsilon 0, 1, \ldots, m$, as having an opcode component $I_k(op)$ and a (possibly empty) constant component $I_k(const)$. The binary translator further computes a mapping from all the locations of the constant components of the input instructions to their corresponding locations in the translation cache 230. Cached constant components are shown in FIG. 2 for each of the emitted instructions $J_0, J_1, \ldots J_n$. Note that the mapping for any given $I_k(const)$ may point to multiple locations, that is, J(constant) values, in the translation cache.

2) The binary translator then uses the mapping information to generate the code-invariant checking prelude for the subset of the input stream that contains instruction opcode and addressing mode bytes. In FIG. 2, this is shown, for each emitted instruction, $J_0, J_1, \ldots, J_n$, as the "verify/compare" prelude. As part of the verification procedure, the system maintains in the translation cache a copy of each translated instruction sequence $I_0, I_1, \ldots, I_m$ as it is input. This is preferably done by encoding each translation-time input instruction as an immediate operand of compare instructions included in the respective verify/compare prelude(s) (that is, possibly more than one).

The checking involved thus comprises a comparison of the input instruction sequence as it exists in the virtual machine just before execution with the corresponding original (copied) instruction sequence. Any modification in the virtual machine of the operational code portion of the instruction sequence between the time of translation and the time of execution of the translation will therefore cause the comparison to fail. Upon failure of the comparison, the system preferably executes a callout to cause retranslation of the instruction sequence. Note that the complement subset of the input stream—the immediate and displacement constants—need not be checked since the current values will be updated in the translation.

3) The binary translator generates the code (the "opcode" sections of the corresponding emitted instructions) that emulates the original instruction sequence. The code generation function does not make any assumptions about the values of the immediate and displacement constants, and keeps track for each immediate and displacement constant of the potentially multiple locations in the translation cache that refer to these constants.

4) The binary translator generates the code update prelude, which is illustrated in FIG. 2 as the "update" block for each emitted instruction, $J_0, J_1, \ldots, J_n$. For each location in the translation cache that refers to an immediate or displacement constant, that is, the J(constant) locations, the code update prelude reads the current value from the memory of the virtual machine (or simulated machine) and copies it to the appropriate location in the translation cache. Note that the update prelude can read this data directly from the virtual machine's memory; neither the binary translator nor any other static code is needed for this operation.

5) Each self-constant-updating translation consists of a code-invariance (verify/compare) prelude, a constant-updating prelude, and the execution component (the actual or "normal" translation of the input instruction). The two preludes—verify/compare and update—may be in either order (or even merged), but must precede the execution part, that is, the execution of the "opcode."

6) The code emitted by the binary translation subsystem must ensure the hardware instruction-cache coherency. In other words, it must take the appropriate steps to make sure that the execution part will indeed use the latest constants stored in memory, and not the constants of a previous iteration. On certain processors, for example, the Pentium Pro and Pentium II, hardware instruction-cache coherency is guaranteed by the processors as long as the same addresses are used to refer to the instruction sequence. However, other architectures require an explicit instruction that flushes the instruction cache, as is the case with the Digital Alpha architecture. Normal design techniques may be used in either case to meet this requirement.

The binary translator may generate the different code sequences in different order, or after multiple iterations (comparable to compiler passes). The invention does not require the binary translator generates the code in any particular order, but rather only a simple dependency for the emitted code. Finally, the self-constant-updating mechanism falls back to the more basic method of code invariance checking if any opcode or operand fails the comparison.

This aspect of the invention allows—for specific code patterns—for code emitted by the binary translation subsystem to be automatically updated to reflect the new state of the virtual machine instruction sequence, without relying on static code. The steady-state execution of a code sequence that contains self-constant-modifying code will therefore consist primarily of the execution of emitted instructions from the translation cache, and a substantial performance improvement. The invention thus makes possible, for the first time, emulation through binary translation of certain self-modifying code patterns, without relying on repeated calls to the translator, or, more generally, on any static code.

FIG. 2 illustrates the principle novel modules and concepts—namely, the addition of preludes to translated sequences. These improvements will typically be incorporated into a binary translation system as in FIG. 1, with certain exceptions noted above. In particular, the invention does not need to rely on any callouts to other modules such as 130, 132, or to any other static code. The various components of a prior art system as in FIG. 1 that are used in the invention are not repeated in FIG. 2 merely for the sake of clarity and simplicity.

Flow Chart of the Decision Process

Figure 3:
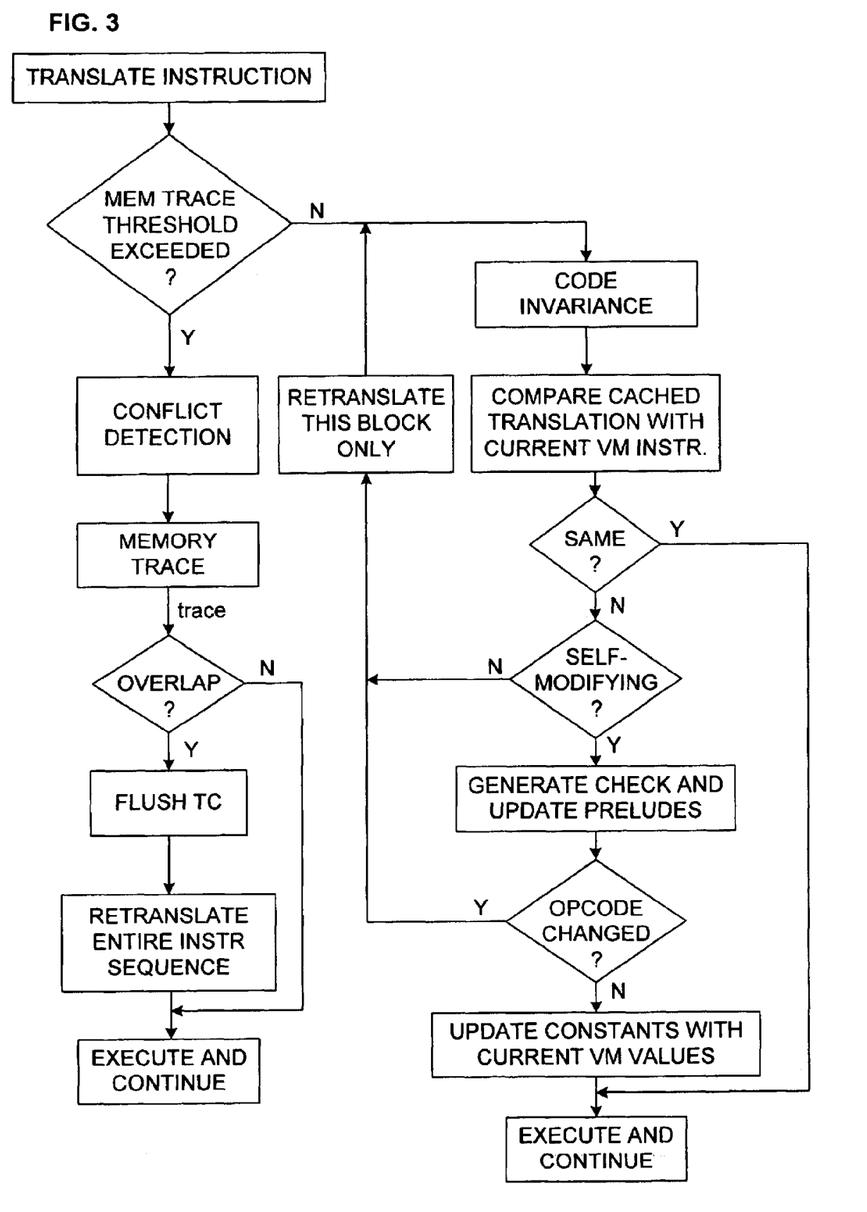
FIG. 3 is a flow chart showing the main decisions and operations of the invention. In particular.

FIG. 3 illustrates the decision and control flow in the preferred embodiment of the invention. All of the various decision blocks have already been discussed above, but are summarized in this block diagram/flow chart for the sake of clarity.

The binary translator system first uses heuristics (for example, whether the memory trace threshold has been exceeded) to decide, for a given translation, between the conflict detection method and the code-invariance check method. This decision is based on the cost optimization function or other heuristics (see above) and is a function of the pages of the virtual machine's memory that contain the input instruction sequences.

If the conflict detection approach is chosen, memory traces are installed on all the pages that contain the input instructions. As is mentioned above, the input set information is also updated, possibly in an inexact manner by computing only a superset of the information. Since the coherency is guaranteed by monitoring the writes to the locations, the emitted translation consists simply of an instruction sequence that emulates the original instruction sequence. Subsequent execution of the virtual machine may however cause writes to occur to the traced pages, which will lead to generation of a trace. If the write is known not to overlap with any input instruction location, then execution can continue without updating the translation cache. If, however, the write location overlaps with the input instruction addresses, then the overlapping translations must be removed from the translation cache. In practice, this may require the flush of the entire translation cache.

If the code-invariance checking approach is chosen, the emitted code contains a prelude that guarantees the invariance of the input instruction sequence. Recall that this entails a comparison of the cached translation of the code with the code at the corresponding original address in the virtual machine. If the check fails then the system decides (for example, based on a heuristic) whether a self-constant-modifying code instruction sequence is assumed or not. If this is assumed not to be the case, a new translation is generated. The previous (stale) translation is made unreachable by replacing the prelude with a branch to the new translation. If the instruction sequence is assumed to be self-constant-modifying, a self-updating translation containing a check-and-update prelude is generated. Again, the previous (stale) translation is made unreachable by replacing the start of the prelude with a branch to the new translation. If the comparison check part of the check-and-update prelude fails, then a new code-invariance-checking translation is generated to replace the stale self-constant-modifying code.

I claim:

1. A method for virtualizing a computer using binary translation comprising the following steps:

converting by binary translation input instruction sequences into output instruction sequences that emulate the corresponding input instruction sequences, the input instruction sequences being stored in predetermined pages of a system memory;

storing the output instruction sequences in a translation cache;

maintaining coherency of the output instruction sequence with the input instruction sequence by selectively executing the following sub-steps:

detecting conflicts in the memory pages in which a first set of the input instruction sequences is stored and executing the corresponding output instruction sequences only in the absence of detected conflicts; and by explicitly checking for code-invariance by checking for post-translation changes in a second set of input instruction sequences by comparing the copied input instruction sequences with a current version of the corresponding input instruction sequence, before executing the corresponding output instruction sequence.

2. A method as in claim 1, in which the step of detecting conflicts includes the sub-step of setting a hardware memory management unit (MMU) of the computer to detect memory traces on the memory pages in which the first set of the input instruction sequences is stored.

3. A method as in claim 1, in which the step of checking for post-translation changes includes the following sub-steps:

storing a translation-time copy of each input instruction sequence in the second set of instruction sequences;

appending to each output instruction sequence for which there is a translation-time copy an instruction invariance prelude and storing the instruction invariance prelude in the translation cache along with the corresponding output instruction sequence;

for each output instruction sequence for which there is an instruction invariance prelude, executing the instruction invariance prelude before executing the corresponding output instruction sequence;

the sub-step of executing the instruction invariance prelude comprising the further sub-steps of:

comparing the corresponding translation-time copy of the input instruction sequence with a corresponding current state of the input sequence; and executing the output instruction sequence only when the current state is the same as the translation-time copy.

4. A method as in claim 3, in which the step of storing the translation-time copy of each input instruction sequence comprises encoding the translation-time copy as an immediate operand of compare instructions in corresponding ones of the instruction invariance preludes.

5. A method as in claim 3, further including the step of reconverting by binary translation only the input instruction sequence for which the current state is different from the translation-time copy.

6. A method as in claim 3, further comprising the following steps:

for each output instruction in an output instruction sequence for which the current state is different from the translation-time copy, detecting whether the output instruction sequence is self-constant-modifying.

7. A method as in claim 6, further comprising the step of reconverting by binary translation only the input instruction sequence for which the current state of operation portions of each instruction included in the sequence is different from a corresponding portion in the translation-time copy.

8. A method as in claim 7, further comprising the following steps:

a) checking for run-time invariance of the operational instruction portion by executing a code-invariance prelude that is appended to the output instruction as stored in the translation cache;

b) for each input instruction sequence for which the current state of the operational portions is the same as corresponding portions in the translation-time copy:

i) executing a constant-updating prelude that is appended to the output instruction and thereby updating the modifiable constant portion of the output instruction by replacing it with a corresponding run-time constant portion of the input instruction in the current state; and ii) executing the output instruction using the updated modifiable constant portion.

9. A method as in claim 1, further comprising the step of switching between conflict detection and code-invariance checking of the input instruction sequences according to a predetermined memory page cost optimization function, which is evaluated for each memory page that contains input instructions.

10. A system for virtualizing a computer comprising:

binary translation means for converting by binary translation input instruction sequences into output instruction sequences that emulate the corresponding input instruction sequences, the input instruction sequences being stored in predetermined pages of a system memory;

a translation cache in which the output instruction sequences are stored;

means for maintaining coherency of the output instruction sequence with the input instruction sequence and, selectively:

for detecting conflicts in the memory pages in which a first set of the input instruction sequences is stored and executing the corresponding output instruction sequences only in the absence of detected conflicts; and for explicitly checking for code-invariance by checking for post-translation changes in a second set of input instruction sequences by comparing the copied input instruction sequences with a current version of the corresponding input instruction sequence, before executing the corresponding output instruction sequence.

11. A system as in claim 10, in which the computer includes a memory management unit (MMU), further comprising conflict detection means for setting the hardware memory management unit (MMU) of the computer to detect memory traces on the memory pages in which the first set of the input instruction sequences is stored.

* * * * *